United States Patent [19]

Hayashi et al.

[11] Patent Number: 4,509,138
[45] Date of Patent: Apr. 2, 1985

[54] WORD PROCESSOR

[75] Inventors: Yoshio Hayashi, Zushi; Kouji Aoyagi, Ayase; Toshio Sakurai, Yokohama; Tusnehiro Kashima, Tokyo; Koichi Higeta, Yokohama, all of Japan

[73] Assignee: Sony Corporation, Tokyo, Japan

[21] Appl. No.: 328,836

[22] Filed: Dec. 9, 1981

[30] Foreign Application Priority Data

Dec. 15, 1980 [JP] Japan .................... 55-176892

[51] Int. Cl.³ ............................................ G06F 7/00
[52] U.S. Cl. ...................................... 364/900; 364/709
[58] Field of Search ............ 364/200, 900, 709, 416, 364/419

[56] References Cited

U.S. PATENT DOCUMENTS

| 3,654,609 | 4/1972 | Bluethman | 364/200 |
|---|---|---|---|
| 3,938,139 | 2/1976 | Day | 340/789 |
| 4,028,681 | 6/1977 | Vittorelli | 364/900 |
| 4,090,247 | 5/1978 | Martin | 364/900 |
| 4,159,525 | 6/1979 | Olander, Jr. et al. | 364/709 |
| 4,181,966 | 1/1980 | Wenninger et al. | 364/709 |
| 4,279,021 | 7/1981 | See et al. | 364/900 |

FOREIGN PATENT DOCUMENTS

| 0008162 | 2/1980 | European Pat. Off. |
| 1341526 | 12/1973 | United Kingdom |
| 1370400 | 10/1974 | United Kingdom |
| 1439528 | 6/1976 | United Kingdom |
| 1491720 | 11/1977 | United Kingdom |
| 1530444 | 11/1978 | United Kingdom |
| 2015220 | 9/1979 | United Kingdom |

OTHER PUBLICATIONS

"The Digital Cassette Subsystem, Part 1", p. 24, vol. 12, No. 2, Byte Magazine, Feb. '77-Rampil-Bremeir.
"The Electric Pencil"-p. 114-Mar. 1979-Kiloband Magazine-Hallen.
Williams et al., "The Panasonic and Quasar Hand-Held Computers", Jan. 1981, pp. 34-45, Byte Publications, Inc.

Primary Examiner—Gareth D. Shaw
Assistant Examiner—Tim A. Wiens
Attorney, Agent, or Firm—Lewis H. Eslinger; Alvin Sinderbrand

[57] ABSTRACT

A portable word processor incorporates a keyboard for typing-in data relating to a textual document, a microprocessor for processing the data, and a microcassette recorder for storing each page of the textual data when typing of the page is complete. A half-line character display is situated on an operating panel of the word processor above the keyboard. The microprocessor includes a text buffer memory having a capacity corresponding to one page, favorably 1800 characters or 66 lines. A cassette recorder interface is included to control operation of the cassette during transfer of textual data from the text buffer memory for storage on the microcassette tape, and transfer of the data to the text buffer memory from the tape for editing and revision of the textual document. The microcassette recorder can store pages of the textual data intermittently with voice recording, such as dictation, on the same tape.

16 Claims, 7 Drawing Figures

FIG. 7 ic tape wound,
WORD PROCESSOR

BACKGROUND OF THE INVENTION

1. Field of the Invention

This invention relates to word processors on which textual information can be composed and stored, and later retrieved for revision and editing. This invention is more particularly directed to a word processor device in which data blocks corresponding to pages of a textual document can be sequentially stored on magnetic tape in a tape cassette, and in which such data blocks can be retrieved therefrom for editing or printing.

2. Description of the Prior Art

It has been desired to provide a word processor which is portable and inexpensive, yet versatile. Such a word processor would find wide application away from the office, such as at meetings or conventions, and while travelling. However, such a word processor must be of compact, yet rugged construction so that it can fit, for example, into an attache-case-sized carrying enclosure. The word processor should also be adapted for battery power so that it can be used when there is no AC power available, such as while travelling. Battery power would, of course, also enable the word processor to be used abroad, where the available AC power is of a different voltage and/or frequency from that available at the home office.

Word processors now in existance utilize a so-called "floppy disk" for storing textual data entered on a keyboard. A disk drive is required to be included in the word processor to write textual data on the floppy disk and to retrieve the data therefrom. This disk drive is rather bulky and massive, and such disk drives tend to be expensive. Furthermore, such disks and disk drives are sensitive to dust, vibration, and power supply fluctuations. Thus, it has not been possible to provide inexpensive disk-based word processors which can be made portable and suitable for use away from the office.

OBJECTS AND SUMMARY OF THE INVENTION

Accordingly, it is an object of this invention to provide a word processor device which overcomes the drawbacks of conventional word processors.

It is another object of this invention to provide a word processor device on which a textual document can be composed, and in which the document can be stored, page by page, on magnetic tape.

It is a further object of this invention to provide a word processor device incorporating a cassette recorder which can be used for recording of oral dictation as well as textual data on the same tape cassette.

It is a still further object of this invention to provide a word processor device in which the data corresponding to a particular page of a textual document can be transferred from a portion of a magnetic tape, edited, and then returned to its respective portion of the tape without disturbing other data corresponding to previous or successive pages of the document.

It is a yet further object of this invention to provide a word processor device as above which can be made compact and rugged to serve as a portable unit.

According to an aspect of this invention, a word processor device is constructed on which a textual document can be composed and edited, and in which textual data representing each page thereof can be temporarily stored, with the stored textual data being transferred, in page units, to and from magnetic tape wound, for example, on a microcassette. Such a microcassette-based word processor device comprises a keyboard on which textual data and word processing commands can be entered manually; a text buffer memory capable of temporarily storing up to one page of the textual data; a character display for visually displaying a portion of the page of textual data stored in the text buffer memory, e.g., a half line thereof; cassette recorder apparatus for transferring the textual data between the text buffer memory and the magnetic tape of the tape cassette; and a signal processing circuit, favorably employing a microprocessor, for controlling the operation of the text buffer memory and the cassette recorder apparatus for transferring the page of textual data to the magnetic tape in response to one word processing command entered on the keyboard, and also transferring a stored page of the textual data from the magnetic tape to the text buffer memory in response to another command entered on the keyboard.

The word processor device can also include audio transducers, such as a built-in microphone and loudspeaker. Favorably, the signal processing circuit includes a microprocessor-controlled interface unit to selectively couple the audio transducers and the text buffer memory to the cassette recorder apparatus. This permits oral dictation and page-length blocks of textual data to be recorded interspersed with each other on the tape. A muting circuit can be included to automatically mute the loudspeaker when a recorded block of textual data is being picked up from the magnetic tape.

The page-length blocks of textual data can be recorded on the magnetic tape in the form of a header code train representing the beginning of a data record corresponding to a page of textual data, a silent inter recording gap, a textual data portion whose data represent the page of the textual document, and a tailer code train representing the end of the data record. To facilitate editing, all such blocks can be made the same length regardless whether the page is filled to its maximum capacity. The inter recording gap should have a length at least as great as the distance separating record/playback and erase heads on the cassette recorder apparatus.

The above and other objects, features, and advantages of this invention will be more fully apparent from the ensuing description of a preferred embodiment thereof, when considered in conjunction with the accompanying drawings.

DETAILED DESCRIPTION OF A PREFERRED EMBODIMENT

Figure 1:
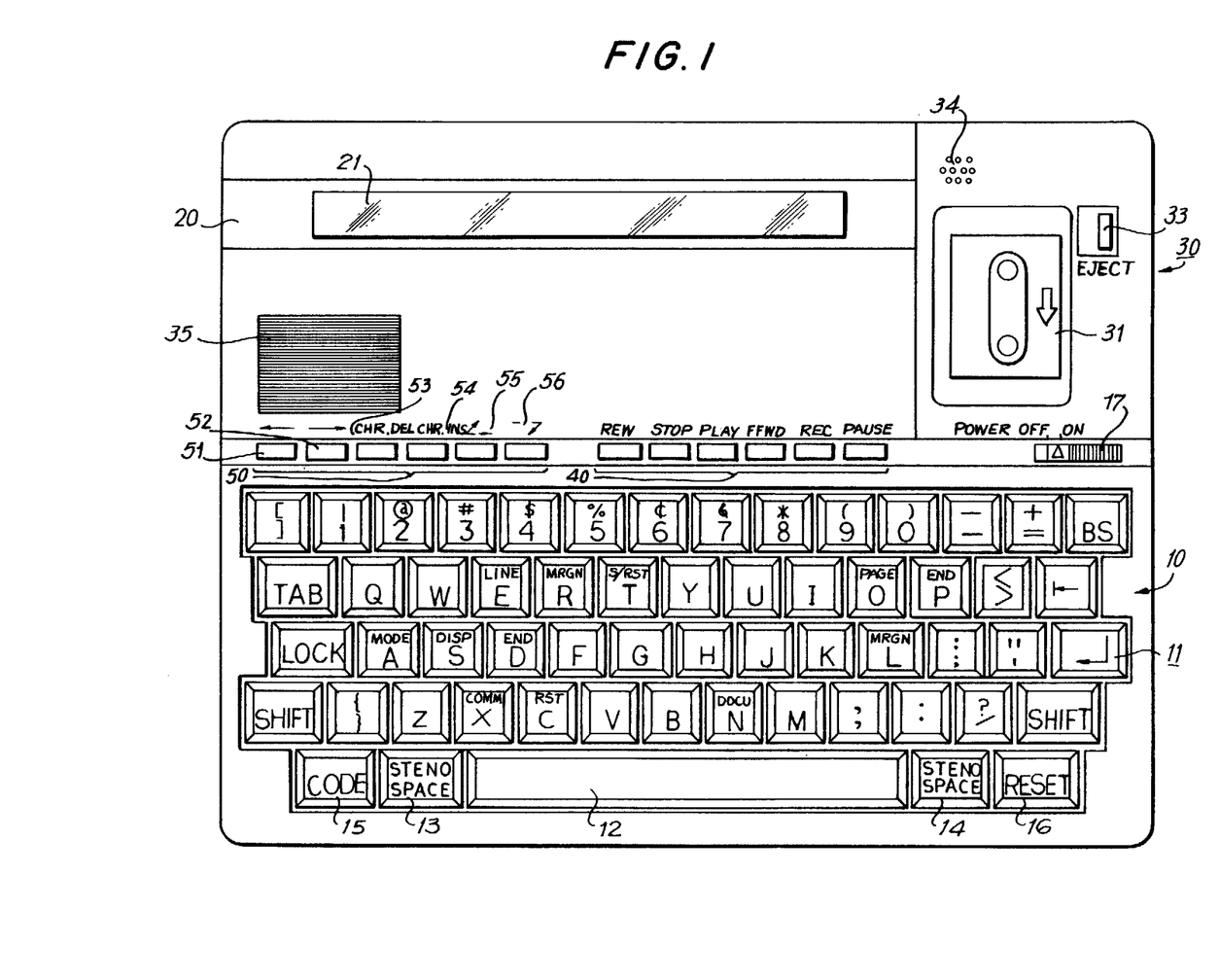
FIG. 1 is a plan view of a microcassette-based portable word processor device embodying the present invention.

Referring to the drawings in detail, and initially to FIG. 1 thereof, an operation panel of a word processor device embodying this invention has a keyboard 10 thereon generally arranged in a standard, or so-called "QWERTY" configuration, including an array 11 of character keys for typing letters, numbers, and punctuation, and also including the usual carriage return, tab, and backspace keys. A space bar 12 is situated at the lower center of the keyboard 10 with steno space keys 13 and 14 to the left and right thereof. A code key 15 is included to the left of the steno space key 13 and a reset key 16 is included to the right of the steno space key 14. A power on/off switch 17 is included above the keys 11.

The steno space keys 13 and 14 are used to carry out a steno function and are intended to reduce both the number of keystrokes and operator stroke time, and thereby to improve typing accuracy and efficiency. The steno function generates a predetermined group of characters when the steno space key 13 or 14 and another single key 11 are depressed. For example if the "A" key and the steno space key 14 are depressed, the word "AND" will be generated. As a further example, if the "%" key (shifted) and the steno space key 14 are both depressed, the word "PERCENT" will be generated. The steno function can also be used to generate suffixes to follow word stems. Each letter and each figure can be used to generate a different respective steno word and steno suffix.

As shown in FIG. 1, several of the keys 11 are marked with a code function word as well as a particular character symbol. The code key 15 is used together with a selected one of these marked keys to generate an associated function command code. For example, a page end command code is generated by depressing the code key 15 and then depressing the P key. Also, a document end command code is generated by depressing the code key 15 and the D key. The reset key 16 serves to deactivate any coded function and to return the keyboard 10 to its typing function.

A keyboard display 20 is disposed above the keyboard 10 and has a half-line liquid crystal display (lCD) module 21 formed of forty characters, each of which is a 5 × 10 dot matrix. In this embodiment each line has a length of eighty characters, with each page having up to sixty-six lines. Accordingly, the display module 21 is arranged to identify the current page number and line number of a particular portion of a typed textual document being displayed thereon, as well as an indication of whether the displayed textual data are on the left or right half of the particular line.

A built-in microcassette recorder 30 is included at the upper right hand portion of the operation panel of FIG. 1. The recorder 30 is shown with a microcassette 31 in place in a microcassette holder 32. An eject button 33 is used to eject the microcassette 31 from the holder 32 for removal of the microcassette 31 therefrom, for example, for storage or shipment to remote location, or for insertion of either a fresh microcassette or a microcassette containing data relating to a document to be edited. The eject key 33 is fitted with a safeguard mechanism (not shown) to prevent the microcassette 31 from being ejected during a recording or playback operation.

A built-in condenser microphone 34 and a built-in loudspeaker 35 are also included on the operation panel for use in recording dictation or other audio information, and for listening to the same, respectively.

A microcassette recorder control panel 40 includes control keys REW, STOP, PLAY, FF, REC, and PAUSE to initiate rewind, stop, fast-forward, record, and pause functions, respectively. These control keys are used during audio recording and playback, and their functions are well known. None of these keys, except the STOP key, are actuable when a page of textual data is being transferred to or from the tape in the microcassette 31. The PLAY key is used to play back voice or other audio recording, and to initiate transfer of textual data from the tape of the microcassette 31.

A control key panel 50 is positioned to the left of the microcassette control panel 40, and includes a cursor-left key 51, a cursor-right key 52, a character-delete key 53, a character-insert key 54, an above-line scroll key 55, and a below-line scroll key 56. These keys 51 through 56 are used to control the presentation displayed on the keyboard display 20 and are especially useful in an editing operation.

During a typing operation and during any editing, a cursor is displayed on the module 21 at the position at which the next character to be typed on the keyboard 10 will appear. Preferably, the cursor takes the form of a bar positioned below the character position.

During an editing operation, the cursor-left key 51 and the cursor-right key 52 are used to move the cursor left and right to a desired editing position, for example, to insert or delete a character.

The character-delete key 53 is pressed to delete any character at the cursor position and to close up the resulting space. The character-insert key 54 is depressed to insert a character or a space at the cursor position, or to adjust the spacing between words.

The above-line scroll key 55 is depressed to display the first forty characters of particular line, or to display the last forty characters of the previous line. Similarly, the below-line scroll key 56 is depressed to display the last forty characters of a particular line, or to display the first forty characters of the next successive line.

Figure 2:
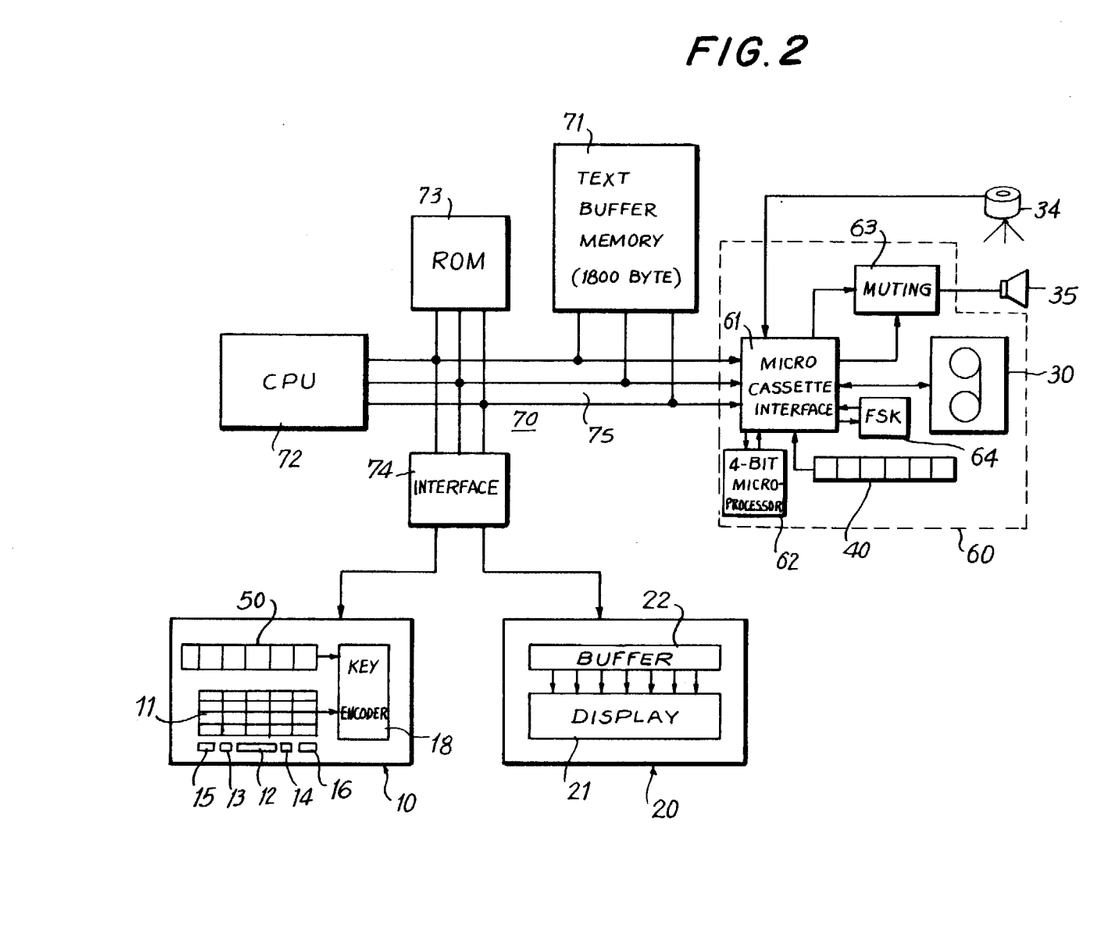
FIG. 2 is a schematic circuit diagram of the word processor device of FIG. 1.

With reference to FIG. 2, the general arrangement of the circuit interconnections for the above-described word processor device will be explained. Elements previously described with reference to FIG. 1 are identified in FIG. 2 with the same reference numerals, and a detailed description thereof will not be repeated.

As shown in FIG. 2, the keyboard panel includes a key-board encoder having inputs connected to the keys 11-16 and to the keys 51-56 of the control key panel 50. Also, the character display 20 includes a display character buffer/driver 22 coupled to the LCD module 21.

A microcassette control board 60, indicated generally by a dash line enclosure, is used for controlling operation of the microcassette recorder 30. The microcassette control board 60 includes a microcassette recorder interface 61 coupled to the microcassette recorder 30 to control operation thereof and to receive commands and to receive textual data for transfer to and from magnetic tape on the microcassette 31. The recorder interface 61 includes a four-bit microprocessor 62 for controlling operation of the microcassette recorder 30. The microprocessor 62 includes a memory for storing an edit-end address code contained in a data block also containing the textual data representing one page of the textual document to be transferred to the tape. The microcassette control board 60 also includes a muting circuit 63 coupled to the loudspeaker 35 to cut the latter out when data is being transferred to and from the microcassette 31. A frequency shift keyer 64 converts textual data to a stream of marks and spaces represented, for example, by audio tones with a frequency of 600 Hz and 300 Hz, respectively. The frequency shift keyer 64 is also operative to convert such tones picked up from tape in the microcassette 31 back into binary data.

A microprocessor 70 controls the operation of the keyboard 10, the display 20, and the microcassette recorder 30. The microprocessor 70 includes a text buffer memory 71, which can be, for example, a random access memory (RAM). The text buffer memory 71 desirably has a capacity of up to 1800 eight-bit bytes for storing up to a maximum of 1800 typed characters or 66 lines, which correspond to one page of text on standard (i.e., letter-size) paper. The text buffer memory 71 thus serves to store data corresponding to a particular page of a textual document temporarily until such data can be transfered to the microcassette 31.

A central processing unit 72 serves as a master control unit to control the operation of the microprocessor, while a read-only memory or ROM 73 stores all of the necessary program steps for operation of the word processor. An interface 74 acts as a buffer to interlink the key encoder 18 of the keyboard 10 and the display buffer 22 of the keyboard display 20 with the microprocessor 70. A data bus 75 provides an internal communication link connecting the text buffer memory 71, the central processing unit 72, the ROM 73, the interface 74, and the microcassette recorder interface 61.

As mentioned above, the text buffer memory 71 stores up to its maximum capacity of 1800 characters, or a maximum of 66 lines. Once the text buffer memory 71 is full, or the page is finished, the operator can enter a text-recording command on the keyboard 10, for example, by depressing the code key 15 and the P key. Then, the contents of the text buffer memory 71 will be transferred through the microcassette recorder interface 61 to the microcassette 31. During such a data transfer, the four-bit microprocessor 62, which receives and stores the edit-end code, takes control of the central processing unit 7Z. Then, when it is determined that the indicated edit-end address corresponding to the end-address code has been reached, the control unit 72 of the microprocessor 70 is released from control of the microprocessor 62, so that the operator can begin to enter into the text buffer memory textual data relating to a new page.

However, if it is desired to display a previously-typed page which is being stored on the microcassette 31, the operator can depresses the PLAY key, whereby a corresponding command signal is generated. In consequence, the central processing unit 72 instructs the microcassette recorder interface 61 to play back the page of textual data stored on the microcassette 31. Then, the microcassette recorder interface 61 and the associated recorder 30 play the page of textual data which is thereby entered into the text buffer memory 71 so that the data can be edited or revised by the operator.

As the microcassette recorder 30 can be operated either to record data or to record audio, it is possible to record both oral dictation and pages of textual data on the same cassette 31. This, of course, makes it possible to describe orally the document, or particular portions thereof, which are recorded on the cassette 31.

Figure 3:
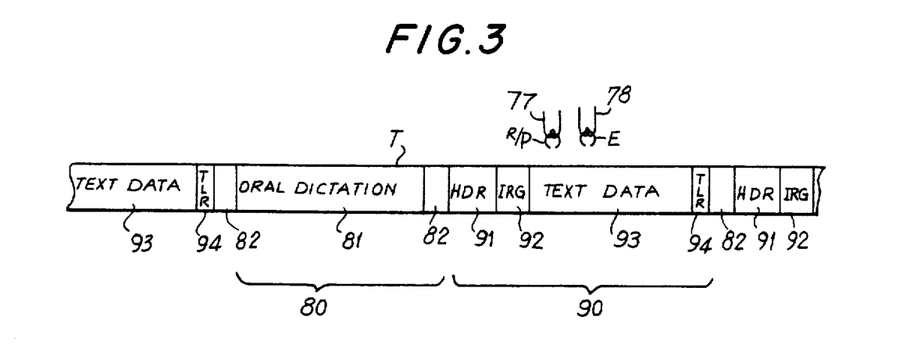
FIGS. 3-5 show the format of textual data recorded on tape by means of the word processor device of FIG. 1.
Figure 4:
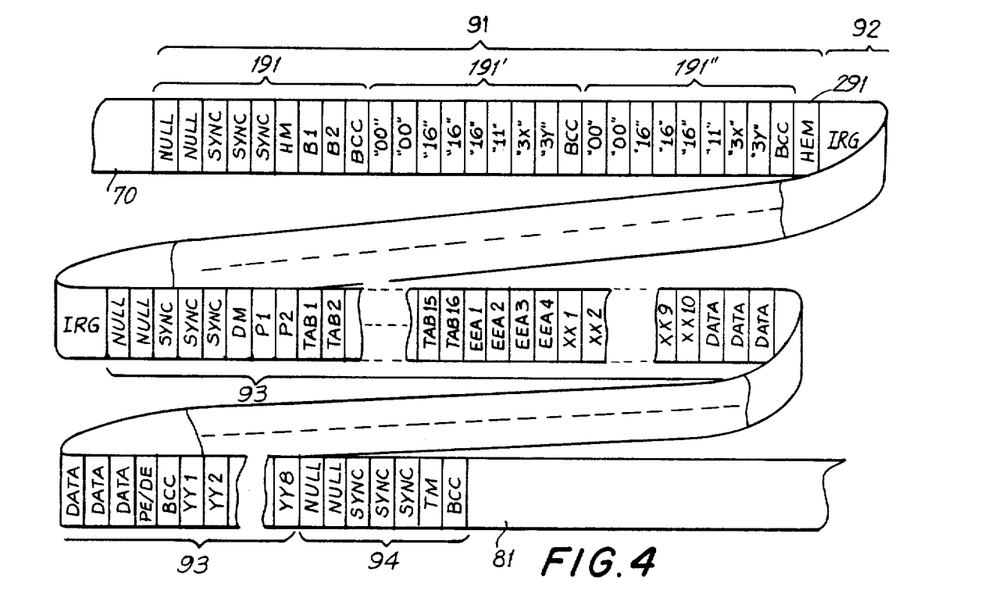
Figure 5:
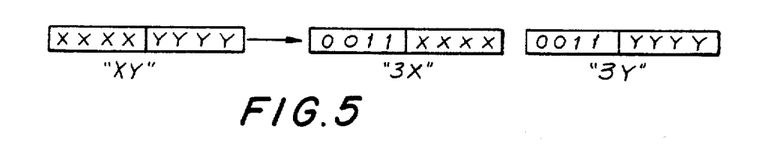

The format used in recording voice and data by means of the above-described word processor apparatus embodying this invention is shown in FIGS. 3, 4, and 5.

FIG. 3 shows the basic tape recording format in which respective segments 80 and 90 of oral dictation and textual data are recorded on a microcassette tape T. For illustrative purposes, a recording and/or playback head 77 and an erase head 78, which are disposed within the recorder 30, are shown next to the tape T.

The audio oral dictation segment 80 includes a segment of recorded voice 81 surrounded by blank guard portions 82.

The data signal segments 90, each corresponding to a single page of textual data, are formed of a header code train 91 of 28 bytes of header data, an inter record gap 92 or silent portion in which no data are recorded, a text code train 93 containing the 1800 bytes of textual data, and a tailer code train containing end-of-message data. Successive data signal segments 90 are separated by a brief blank guard portion 82.

The inter record gap 92 and the blank guard portion 82 are longer than the separation distance between the record and/or playback head 77 and the erase head 78. Preferably, the inter recording gap 92 is of about two seconds duration.

Throughout the ensuing discussion, numbers enclosed in quotation marks represent hexadecimal numbers, i.e. "0" through "F" to correspond to decimals 0 through 15, respectively.

As shown in greater detail in FIG. 4, the header code train 91 includes three successive identical header code blocks 191, 191' and 191". Each of the header code blocks 191, 191' and 191" contains two null bytes, each of which is hexadecimal "00", followed by three synchronizing bytes, each of which is a hexadecimal "16". Then follow a header mark code, which in this case is a hexadecimal "11" and a block address code B1,B2 of two bytes. As shown in FIG. 5, the block address code is formed by splitting an eight-bit block address byte "XY" into an upper four-bit nibble "X" and a lower four-bit nibble "Y". Then, a dummy nibble of "3" is added so that the block address code appears as successive eight-bit bytes "3X" and "3Y". Each block 191, 191' and 191" ends in a block check code which can be derived, by modulo-two addition, as a parity code. A header end mark code 291 is included following the last header code block 191".

As mentioned above, the inter recording gap 92 is at least as long as the separation between the recording and/or playback head 77 and the erase head 78. This enables a particular page of text to be read off the tape and entered into the text buffer memory 71, and then edited and replaced, as edited, on the tape T without disturbing any of the remaining portions of the tape and without having to change the header code train 91.

In this embodiment, the text code train 93 is formed of two null bytes, three synchronizing bytes, and a data mark code DM, here a hexadecimal "1A". Then follow thirty-two bytes constituting data control codes. The data control codes include a page address code P1, P2 formed as shown in FIG. 5, of two four-bit nibbles each combined with a hexadecimal "3". Tab address codes TAB-1 to TAB-16 identify the arrangement of tabs and margins on the page. End address codes EEA1 to EEA4 identify the page length of the textual data contained in the text code train 93 and are used, as aforesaid, to control the operation of the four-bit microprocessor 62. Ten bytes XX1 to XX10 are reserved for future system expansion. Then follow the 1800 bytes of textual data, a page-end or document-end code PE/DE, and a parity check code BCC which can be used for error detection and/or correction. Eight dummy codes YY1 to YY8 are also reserved for future system expansion.

The tailer code train 94 includes two null bytes, three synchronizing bytes, a tailer mark TM, which is "13", and a block check code or parity code. Here the parity code is also "13".

In the tape format as shown in FIG. 3, the length of the data signal segment 90 is of a constant predetermined length for every page of the textual data.

The above-described conversion as shown in FIG. 5 is carried out for each byte of the page address code P1, P2 and the block address code B1, B2, as well as for the tab codes TAB-1 to TAB-16. This prevents the corresponding page and block identification and tabulation settings from being erroneously misinterpreted if an error occurs, for example, due to dropout or misreading of the reproduced data.

Because the length of each data signal segment 90 is constant, regardless of the amount of textual data occurring on the respective page, it is possible to edit or rewrite any one of several successive data signal segments 90 sequentially recorded on the microcassette tape T without disturbing any of the previous or successive data signal segments 90.

The blank guard portions 82 are included for the purpose of avoiding any recording during the times that the tape T is undergoing startup or stopping.

The central processing unit 72 acts, upon occurrence of the tape header code train 91, to provide a muting signal to the muting circuit 63. Then, during the transfer of the text code train 93 between the text buffer memory 71 and the microcassette recorder 30, the speaker 35 is prevented from emitting undesirable data tones. However, upon the occurrence of the tailer code train 94, the unit 72 releases the muting circuit 63.

The recorder 30 is set into a stop mode by the unit 72 when the tailer code train 94 is detected.

Figure 6:
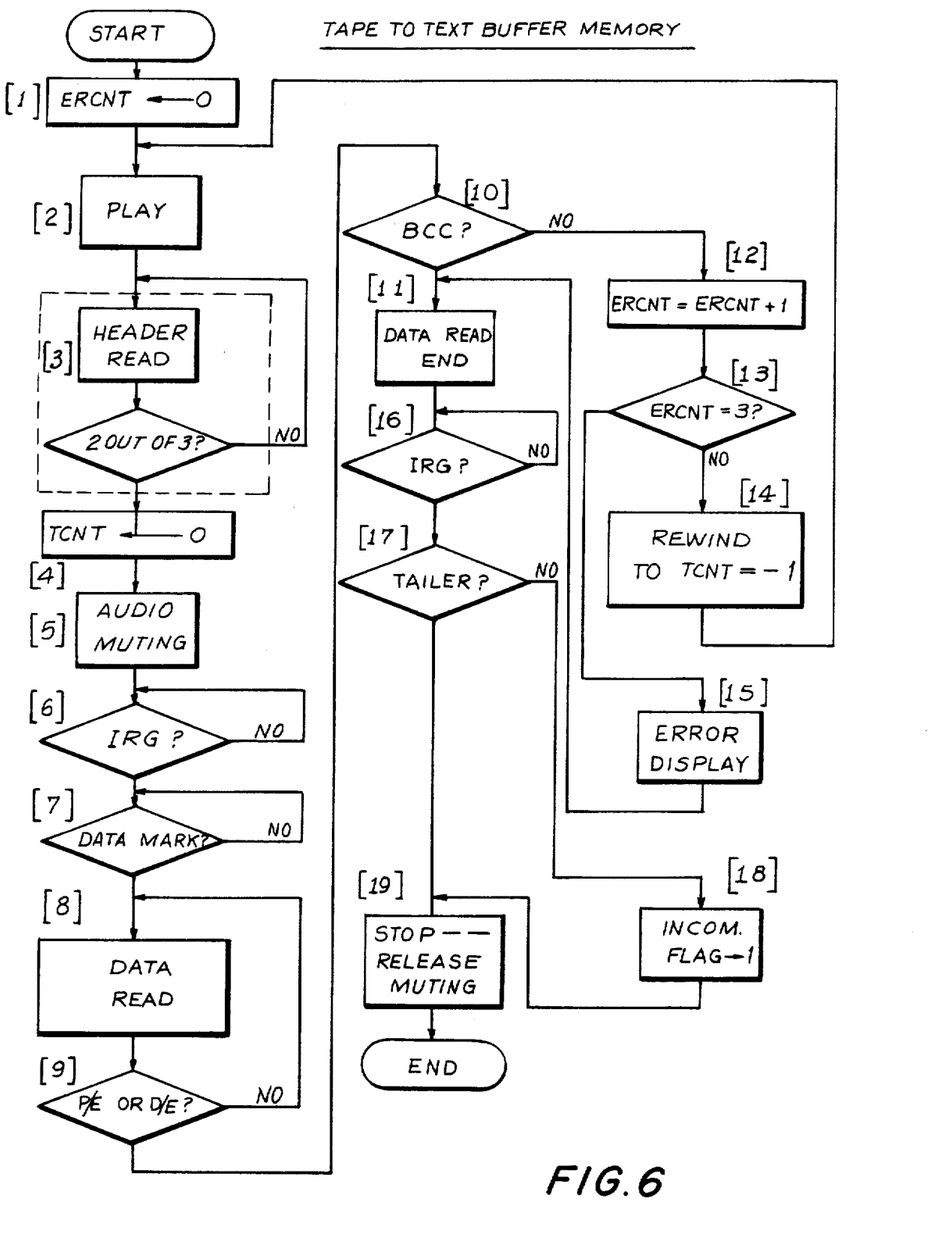
FIGS. 6 and 7 are flow charts respectively used in explaining the retrieval of a page of textual data from tape and return to the tape of the page of textual data.
Figure 7:
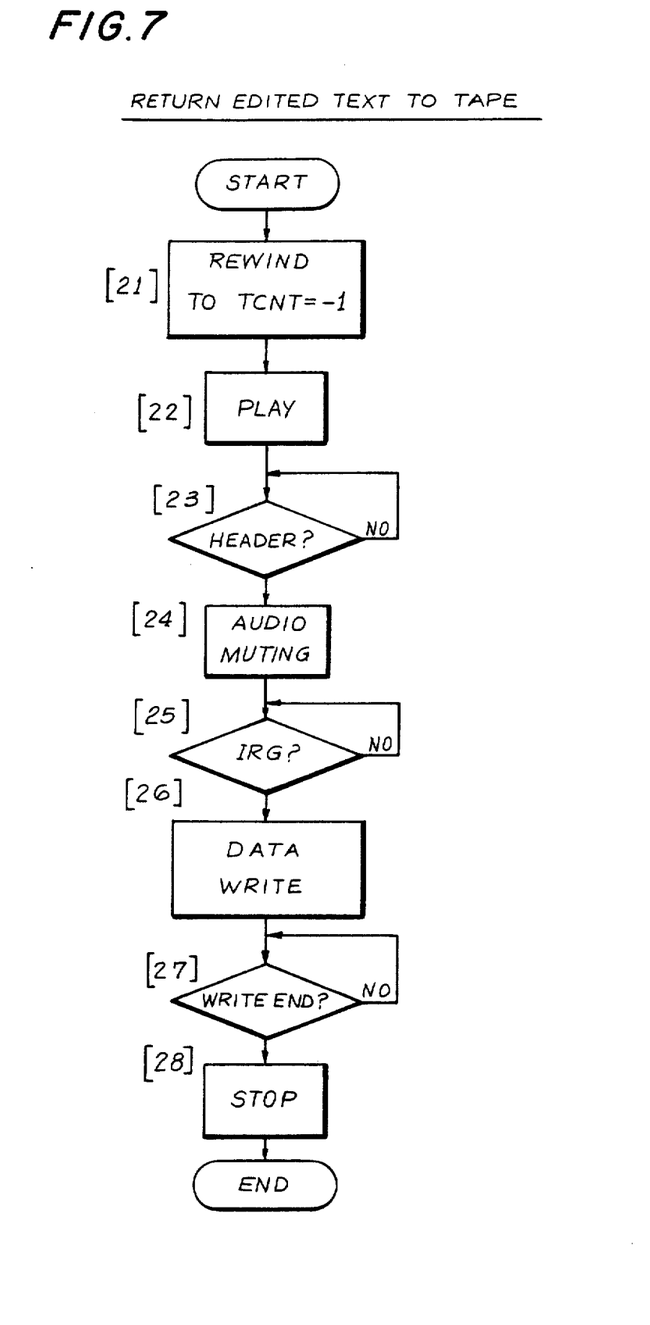

The operation in which a typed page of textual data is read from the tape T into the text buffer memory 71 can be explained with respect to the flow chart of FIG. 6, and the rewriting of an edited page of textual data from the text buffer memory 71 back onto the tape T can be explained with reference to the flow chart of FIG. 7.

By depressing the PLAY key on the panel 40, an operator starts the operation of reading of a particular data signal segment 90, corresponding to a desired page of textual data, into the text buffer memory 71. Then, in step [1], an error counter ERCNT in the microprocessor 70 is set to zero.

In step [2], the microcassette recorder 30 is set into its playback mode, and the microcassette tape T is advanced past the record and/or playback head 77.

At this time, the header code train 91 is read and interpreted (Step [3]). If two out of three of the redundant header code blocks 191, 191', and 191" are the same, the routine proceeds to step [4]; otherwise, the tape is rewound to a point in advance of the header code train 91, and the tape T is read a second time.

In step [4], a tape counter TCNT in the microprocessor 62 is set to zero, and at that time, in step [5], an audio muting signal is provided to the muting circuit 63. Thereafter, in step [6], the inter record gap 92 is checked. In step [7], when the data mark DM is detected, the text code train 93 is read from the tape T and is accordingly entered into the text buffer memory 71 (step [8]). This continues until a page end or document end character PE or DE is sensed (step [9]).

In step [10], the data block check code character BCC is compared with the parity of data in the text code train 93, and if the block check code BCC matches, the routine proceeds to step [11]; otherwise, if the block check code BCC does not match, indicating the presence of an error, the routine proceeds to step [12].

In the latter case, the error counter ERCNT is incremented by 1. Then, in step [13], the contents of the error counter ERCNT are compared with a fixed value such as 3, and if less than that value, the tape T is rewound until the tape counter TCNT is −1. That is, the tape T is rewound to a point in advance of the header code train 91. After that, all of the foregoing steps [2] through [10] are reiterated, and another attempt is made to enter the textual data free of errors into the text buffer memory 71.

When three attempts have been made to read the textual data into the memory 71 and the block check code BCC is again determined in step [10] to be in error (ERCNT=3), an error indication is displayed (step [15]) and the routine proceeds to step [11].

In step [11], the microprocessor 70 ceases to write any further textual information into the text buffer memory 71. Then, the tape T is checked for the next inter record gap 92 (or silent segment 82) (step [16]) and is also checked for the existence of the tailer code train 94 (step [17]). If the tailer code 94 is reached before the next gap 82 or 92 occurs, the microcassette recorder 30 is set into its stop mode, and the muting circuit 63 is released from muting. However, if the next gap 92 occurs before the next tailer code train 94 is detected, an "incomplete" flag is set at "1" and an "incomplete" indication is shown on the keyboard display 20 (step [18]), and then the routine proceeds to step [19] where the recorder 30 is stopped and the circuit 63 is released from muting.

Once the page of textual data from the text code train 93 is stored in the text buffer memory 71, such data can be called up and displayed, a half line at a time, for editing and correction or to insert additional textual data. Then the page of rewritten, edited, and/or corrected textual data can be returned to its original place on the tape as a new text code train 93 following the original header code train 91 and inter record gap 92.

The return of the edited textual data to the tape T of the microcassette 31 can be explained with reference to the flow chart of FIG. 7.

When the operator has checked and finished editing the page of text, the operator depresses the code key 15 and the P (end) key. This supplies a page end command to the central processing unit 72.

At this time, the tape T is rewound until the counter TCNT has a content of −1 (step [21]). This tape position corresponds to the beginning of the header code train 91. Following this, the microprocessor 70 switches the cassette recorder 30 into its playback mode (step [22]) and the microprocessor 70 checks for the existence of the header code train 91 (step [23]). Then, when the header code train 91 occurs, the central processing unit 72 supplies a muting signal to the muting circuit 63 (step [24]), and the existence of the inter record gap 92 is checked (step [25]). When the gap 92 is detected, the contents of the text buffer memory 71 are transferred through the microcassette recorder interface 61 to the microcassette recorder 30 and the textual data are written by means of the head 77 onto the tape T as the text code train 93. The tailer code train 94 is recorded following the text code train 93, and the head 77 ceases recording (step [27]). Then, when the recorder 30 reaches the next blank portion 82, the recorder 30 is set into its stop mode, and the operation is complete.

It should be apparent that with the word processor device as described hereinabove, data corresponding to a multi-page document can be easily composed and later edited. More specifically, the word processor device of this embodiment operates in a page-by-page format, so that if it is desired to change the typed words on any particular page of a document, that particular page can be easily retrieved from the tape cassette 31 and placed into the text buffer memory 71 for editing. Then, the edited page of textual data can be easily returned to the same place on the tape T of the tape microcassette 31.

Because the number of characters for each segment 90 of textual data is comparatively small, i.e., a maximum of one page, a predetermined length of tape can be used for each such portion 90. Thus, the tape is always advanced such predetermined length corresponding to the maximum capacity of the text buffer memory 71 whenever a page of the textual data is recorded on the tape. In consequence, it is always possible to retrieve a particular page of the textual data, edit it, and then reinsert the same on the tape T without disturbing any other recorded segment 80 or 90.

Also, as mentioned briefly above, the four-bit microprocessor 62 of the microcassette recorder interface 61 stores the edit-end address codes EEA1 to EEA4 occurring in the data code train 93. During the transfer of textual data between the microcassette recorder 30 and the text buffer memory 71, the four-bit microprocessor 61 controls the central processing unit 72 of the microprocessor 70. However, when the designated edit-end address, as indicated by the stored edit-end-address codes EEA1 to EEA4, is reached upon recording, the central processing unit 72 is freed from control of the microcassette recorder interface 61 and the four-bit microprocessor 62 so that textual data relating to a new page can be entered in the text buffer memory 71.

The electronic circuitry including the key encoder 18, the display character buffer/driver 22, the microprocessor 70 and the microcassette interface 61 all have extremely low current requirements. Furthermore, the microcassette recorder 30 also has a low current requirement, and in addition, is operated only intermittently. Thus, the entire word processing device according to this invention can be constructed to operate from battery power, and can be made quite compact and portable.

Further, because the word processor device of this invention uses a microcassette recorder 30 rather than a disk drive, and a liquid crystal display 21 rather than a cathode ray tube, the device can be constructed to be extremely rugged and well suited for use during travel.

While not shown specifically herein, peripheral devices can be easily coupled to the word processor device. For example, a compact letter printer can be provided to print the data stored in the text buffer memory 71. Also, a telephone modem can be coupled to the word processor device to receive textual data from a remote unit or to transmit textual data thereto. Moreover, a video coder can be connected so that the entire page contents of the text buffer memory 71 can be displayed on a convenient television receiver.

Furthermore, many other embodiments of this invention can be constructed. For example, it would be possible for the text buffer memory 71 to store a somewhat larger or somewhat smaller number of characters, for example, corresponding to 3600 characters, or to a lesser number, such as 900. Also, it would be possible to construct a word processor device incorporating a standard-cassette recorder, or a so-called mini-cassette recorder, in place of the microcassette recorder 30.

While a single preferred embodiment of this invention has been described in detail hereinabove, many modifications and variations would be apparent to those skilled in the art without departing from the scope or spirit of the present invention, which is to be defined by the appended claims.

What is claimed is:

1. A word processor device on which a page of a textual document can be composed and edited, and in which textual data representing said page can be temporarily stored and the stored textual data transferred to and from magnetic tape wound on a tape cassette, the word processor device being a unitary and integral device and comprising:

keyboard means integrally formed with said word processor device for manually entering said textual data and for entering word processing commands;

information buffer means integrally formed with said word processor device and connected to said keyboard means for temporarily storing one page of said textual data;

character display means integrally formed with said word processor device for visually displaying at least a portion of the page of textual data stored in said information buffer means;

cassette recorder apparatus integrally formed with said word processor device for transferring said one page of said textual data between said information buffer means and the magnetic tape of said tape cassette, the latter containing any such pages of transferred textual data in sequential order; and signal processing means for controlling the operation of said information buffer means and said cassette recorder apparatus for transferring said page of textual data to said magnetic tape in response to a word processing command entered on said keyboard means, and also transferring a stored page of said textual data from said magnetic tape to said information buffer means in response to another command entered on said keyboard means;

said keyboard means, said information buffer means, said cassette recorder apparatus, said signal processing means, and said character display means integrally forming said word processor device being arranged in a size, shape and weight that is personally portable.

2. A word processor device according to claim 1, wherein said signal processing means includes a microprocessor including a permanent storage device containing steps for controlling the transfer of said textual data, a control unit for controlling the transfer of said data in response to said stored program steps, keyboard interface means coupled to said keyboard means to process data and commands entered on said keyboard; recorder interface means coupled to said cassette recorder apparatus to control operation thereof and to receive data for transfer to and from said magnetic tape; and data bus means linking said permanent storage device, said control unit, said keyboard interface means, said recorder interface means, and said information buffer means.

3. A word processor device according to claim 2, wherein said recorder interface means includes recorder microprocessor means for controlling operation of said cassette recorder and said control unit during transfer of data between said information buffer means and said tape, including a memory for storing an edit end address code contained in a data block containing the textual data representing one page of the textual document to be recorded on the tape, and means for releasing the control unit of said microprocessor from control of said recorder interface means when an edit end address is reached corresponding to said edit end address code so that said keyboard means can enter textual data relating to a new page into said information buffer means.

4. A word processor device according to claim 3, further comprising audio transducer means coupled to said cassette recorder apparatus, wherein said recorder interface means selectively couples said audio transducer means and said data bus means to said cassette recorder apparatus so that audio information and blocks of data representing pages of said textual document can be recorded interspersedly on the same magnetic tape.

5. A word processor device according to claim 4, wherein said audio transducer means include a loudspeaker for audibly reproducing any audio information picked up when said magnetic tape is played back, and said recorder interface means includes muting means for automatically silencing said loudspeaker when a recorded block of textual data is being picked up from said magnetic tape.

6. A word processor device according to claim 5, wherein each said block representing a page of a textual document is formed of a header code train representing the beginning of a data record corresponding to a single page of text, a textual data portion representing said single page of said document, and a tailer code train representing the end of said data record, and said muting means automatically silences said loudspeaker in response to detection of a portion of said header code train and releases said loudspeaker from silencing in response to detection of a portion of said tailer code train.

7. A word processor device according to claim 3, wherein said recorder interface means includes recorder microprocessor means controlling said cassette recorder and said control unit while textual data is being transferred between said information buffer means and said magnetic tape.

8. A word processor device according to claim 7, wherein said recorder microprocessor means includes end address memory means for storing edit end address codes corresponding to the end position of the one page of textual data to be transferred between said information buffer means and said magnetic tape, and means for releasing said control unit from control of said recorder microprocessor means when said end position is reached, so that said keyboard means can enter new textual data into said text buffer memory.

9. A word processor device according to claim 1, wherein said information buffer means stores at most a single page of said textual data, and said signal processing means transfers the contents of such single page to said magnetic tape as a block to free said information buffer means to store new textual data relating to another such page.

10. A word processor device according to claim 9, wherein each such block transferred to and recorded on said magnetic tape to represent a page of textual data, regardless of the amount of such textual data contained in said information buffer means, up to one full page capacity thereof, is of a predetermined fixed length.

11. A word processor device according to claim 1, wherein each said block representing a page of a textual document is formed of a header code train representing the beginning of a data record corresponding to a single page of text; an inter recording gap; a data control train; the textual data representing said single page; and a tailer code train representing the end of said data record.

12. A word processor device according to claim 11, wherein said cassette interface means includes a frequency-shift keyer device providing the data of each said block as a series of marks and spaces, the marks and spaces being audible tones of respective first and second frequencies, the cassette recorder being capable of picking up and recording signals within a range including said first and second frequencies; and wherein said header code train, said data control train, said textual data, and said tailer code train are formed of sequences of said marks and spaces, while said inter recording gap is formed of an absence of such marks and spaces.

13. A word processor device according to claim 11, wherein said header code train includes a succession of a plurality of identical header code blocks, each containing at least one synchronizing word, a header mark code word, at least one block address word, and a block check character whose elements represent the parity of the remainder of header code block; and a header end mark code word between the last such header code block and the inter recording gap;

14. A word processor device according to claim 13, wherein said recorder interface means, in response to actuation of a predetermined command entered on said keyboard means, enters into said information buffer means the textual data contained in the block representing a selected page, and thereafter in response to a rewrite command entered on said keyboard means causes said cassette recorder apparatus to record the block representing said page beginning after said header code train.

15. A word processor device according to claim 11, wherein said tailer code train includes at least one synchronizing word; tailer mark code word; and a block check code word whose elements represent the parity of the remainder of said tailer code train.

16. A word processor device according to claim 9, wherein said cassette recorder apparatus includes a record and/or playback head and an erase head separated by a distance along said magnetic tape, and said inter recording gap is of a length greater than such distance.

* * * * *